United States Patent [19]
Kimura et al.

[11] Patent Number: 5,326,518
[45] Date of Patent: Jul. 5, 1994

[54] PREPARATION OF SINTERED ZIRCONIA BODY

[75] Inventors: Yutaka Kimura; Osamu Minesita; Yukihiko Haneishi; Osamu Tanegashima, all of Funabashi, Japan

[73] Assignee: Nissan Chemical Industries, Ltd., Tokyo, Japan

[21] Appl. No.: 955,131

[22] Filed: Oct. 1, 1992

[30] Foreign Application Priority Data

Oct. 8, 1991 [JP] Japan ................................. 3-260266

[51] Int. Cl.$^5$ ................................................ C04B 35/48
[52] U.S. Cl. .................................... 264/63; 264/328.2
[58] Field of Search ............................ 264/63, 328.2

[56] References Cited

U.S. PATENT DOCUMENTS

| | | | |
|---|---|---|---|
| 2,434,271 | 1/1948 | Howatt | 264/328.2 |
| 4,873,064 | 10/1989 | Kato | 501/103 |
| 5,009,587 | 4/1991 | Corvaglia et al. | 264/328.12 |

FOREIGN PATENT DOCUMENTS

| | | |
|---|---|---|
| 0315586 | 10/1988 | European Pat. Off. |
| 0420284 | 9/1990 | European Pat. Off. |
| 0444475 | 2/1991 | European Pat. Off. |
| 60-30143 | 2/1985 | Japan |
| 60-206613 | 10/1985 | Japan |
| 61-97134 | 5/1986 | Japan |
| 61-43286 | 9/1986 | Japan |
| 63-185821 | 8/1988 | Japan |
| 3-174356 | 7/1991 | Japan |
| 3199003 | 8/1991 | Japan ................................. 264/328.2 |

OTHER PUBLICATIONS

Patent Abstract of Japan, vol. 13, No. 63 Feb. 13, 1989 (Kishimoto Sangyo KK) Database WPIL, Week 8914, Derwent Pub. Ltd., London, GB; JP-A-1 051 921 (Polyplastics KK) 28.

Primary Examiner—James Derrington
Attorney, Agent, or Firm—Birch, Stewart, Kolasch & Birch

[57] ABSTRACT

A zirconia compound comprised of zirconia powder and an organic binder which flows smoothly in a molten state is injection molded in a sprue-runnerless fashion, removed of the binder, and fired, obtaining a high density zirconia sintered body.

9 Claims, 1 Drawing Sheet

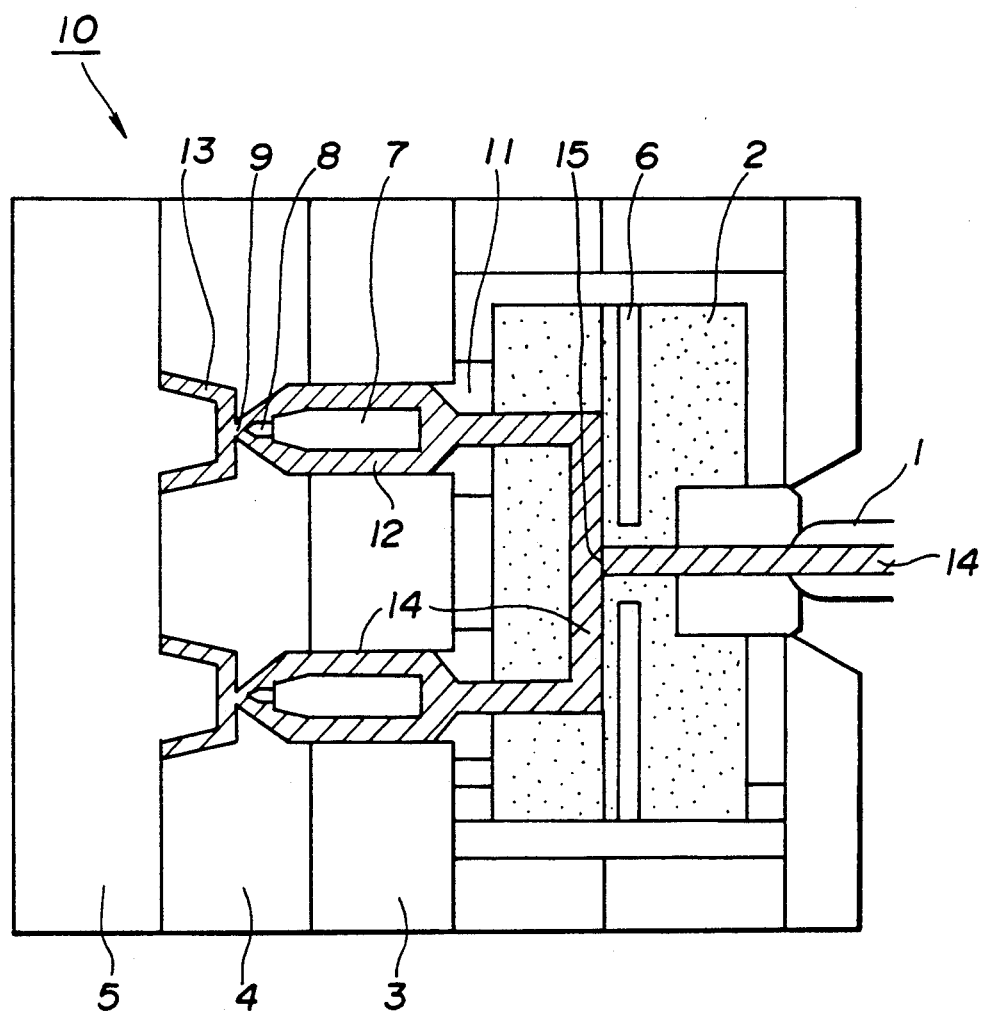

PREPARATION OF SINTERED ZIRCONIA BODY

FIELD OF THE INVENTION

This invention relates to a method for preparing a high-density zirconia sintered body by spure-runnerless injection molding a zirconia compound followed by binder removal and firing.

BACKGROUND OF THE INVENTION

Injection molding is one of the well-known techniques for the preparation of sintered zirconia. See U.S. Ser. No. 07/588,180 filed Sep. 26, 1990 now abandoned or EP 0 420 284 A2 published Apr. 3, 1991. Sintered zirconia is generally prepared by blending zirconia powder with an organic binder to form a molding composition and injecting the composition into a mold to form a green body of predetermined shape, followed by binder removal and firing.

The mold which is used for the injection molding of ceramics including zirconia generally has a cavity defining a shape conforming to a desired product and a gating system including a sprue, a runner, and a gate to the cavity. The compound is melted in a cylinder of the injection molding machine. The molten compound is introduced to the sprue of the mold from a nozzle at the distal end of the cylinder and then fills the runner until it reaches the gate. Past the gate, the compound fills the cavity where it is cooled and solidifies. Finally, the mold is opened and the molded compound or green body is removed therefrom. Since the green body has a burr corresponding to the sprue and runner at this point, the burr must be cut off before the desired green body can be obtained.

In the prior art, molds for use in injection molding ceramic compounds are designed to have a sprue with a large draft or taper, a thick runner, and a gate with a large cross sectional area since the ceramic compounds are considerably lower in flow, ability to fill very narrow areas, and green strength than plastics.

In particular, the sprue and runner which do not form part of the final molding were necessary and indispensable in the prior art ceramics injection molding technique. From the standpoint of efficient use of a source compound, the sprue and runner (so called "cold runner") portions were recovered and recycled. This recycle procedure, however, had the drawbacks of increased contamination and deteriorated flow of the compound. Further, the process required extra steps of cutting the molding from the runner portion at the gate and machining the residual gate portion away from the molding.

Included in the plastics injection molding technique is a special molding technique using a mold free of sprue and runner which is known as a "sprue-runnerless molding or hot-runner molding." See Japanese Patent Application Kokai (JP-A) Nos. 30143/1985 and 206613/1985. Although the sprue-runnerless molding technique provides efficient use of a source compound, its application is limited to those plastic compounds featuring good flow. There is found no example in which the technique is successfully applied to ceramic and other compounds having increased filler loadings.

We previously found that a zirconia powder is suited for injection molding when it meets an optimum balance of particle shape, average particle size and specific surface area (U.S. Ser. No. 07/588,180 now abandoned or EP 0 420 284 A2). Continuing research works, we have found that the sprue-runnerless injection molding technique which has been limited to well flowing plastic compounds can be applied to a zirconia compound under specific conditions.

SUMMARY OF THE INVENTION

Therefore, an object of the invention is to utilize a sprue-runnerless injection molding technique in the preparation of a sintered zirconia body. Another object is to prepare a high density sintered zirconia body in a relatively simple manner in high yields.

According to a first aspect of the present invention, there is provided a method for injection molding a zirconia compound in a mold defining a cavity and having a runner and a pin gate disposed at the end of the runner in fluid communication with the cavity. The zirconia compound is comprised of an organic binder and a zirconia powder containing 2 to 10 mol% of $Y_2O_3$ and having a specific surface area of up to 12 $m^2/g$ as measured by the BET method and a product of an average particle size by the specific surface area of up to 3 $\mu m \cdot m^2/g$. In a first or injection step, the zirconia compound in molten state is passed through the runner and injected into the cavity through the pin gate while the runner is heated hot enough to keep the zirconia compound molten. In this case, the pin gate also may be heated if necessary. In a next solidification step, while the runner is kept hot enough to keep the zirconia compound molten, the pin gate is cooled enough to allow the zirconia compound to solidify and the cavity is cold enough to allow the zirconia compound to solidify. Then the zirconia compound solidifies in the cavity and the pin gate while the zirconia compound remains molten in the runner. Finally, the solidified portion at the pin gate and the solidified portion in the cavity are separated by rupture, thus obtaining the solidified portion in the cavity as a runnerless molding.

In a second aspect, the present invention is directed to a method for preparing a sintered zirconia body comprising the steps of (1) injection molding a zirconia compound in a mold in accordance with the molding method of the first aspect, thus obtaining a runnerless green body, (2) removing the binder from the green body, and (3) firing the green body into a sintered body.

BRIEF DESCRIPTION OF THE DRAWING

The only figure is a schematic cross section of a mold having four cavities used in the injection molding method according to the present invention.

DETAILED DESCRIPTION OF THE INVENTION

In general, compounds loaded with high amounts of ceramic particles are improved in flow as the particle shape approaches true sphericity. Inversely, particles tend to tangle and interfere with each other to a greater extent, and thus lower fluidity, the more that they have more angular projections or are more agglomerated. Provided that zirconia particles are truly spherical, their product of average particle size by specific surface area is approximate to 1 $\mu m \cdot m^2/g$. Differently stated, as the product of average particle size by specific surface area becomes closer to 1 $\mu m \cdot m^2/g$, the particles are closer to true spheres, more free of agglomeration and thus smoother in flow. It is to be noted that the average particle size is as measured by a centrifugal sedimentation method.

The zirconia powder used herein should have an average particle size multiplied by specific surface area of up to 3 μm·m$^2$/g, preferably 1.0 to 2.7 μm·m$^2$/g. The powder should also have a specific surface area of up to 12 m$^2$/g as measured by the BET method. Zirconia powder having a specific surface area of more than 12 m$^2$/g requires an undesirably large amount of organic binder, resulting in a compound which undergoes substantial shrinkage deformation after firing. The preferred BET specific surface area is from 5 to 10 m$^2$/g. Further a smaller average particle size is preferred, say, up to 0.4 μm. Since the gate of the sprue-runnerless injection molding mold has a considerably smaller cross-sectional area than conventional mold gates, larger particles can cause blockage in the vicinity of the gate, render the compound's flow unstable to reduce the yield of molding, or cause increased wear of the gate and the chip heater disposed therein. However, a certain lower limit exists with average particle size because as the average particle size becomes smaller, the BET specific surface area increases and the amount of binder added is increased. For this reason, a particle size of 0.2 to 0.35 μm is more preferred.

The zirconia powder used herein should contain 2 to 10 mol%, preferably 2 to 8 mol% of yttria ($Y_2O_3$) in solid solution form. If the content of yttria in solid solution form is less than 2 mol%, there occur problems including a lowering of strength and irregular thermal expansion. If the content of yttria in solid solution form is more than 10 mol%, there occur problems including reduced strength and a loss of solid electrolyte performance associated with a lowering of electric conductivity at high temperatures.

These zirconia powders can be produced by the methods of JP-B 43286/1986, JP-A 185821/1988 and JP-A 97134/1986 or U.S. Pat. No. 4,873,064, for example.

The organic binder used herein may be selected from those commonly used in injection molding of ceramics. Examples include
(a) hydrocarbon waxes such as paraffin wax,
(b) plasticizer including phthalates such as dioctyl phthalate, dibutyl phthalate, diethyl phthalate, etc. and adipates such as dioctyl adipate, dibutyl adipate, etc.,
(c) deflocculants such as aliphatic amines,
(d) dispersants such as cationic, anionic and nonionic surface active agents,
(e) oils such as mineral oil, tung oil, and coconut oil,
(f) low molecular weight compounds such as fatty acids, fatty acid esters, and alcohols, and
(g) thermoplastic resins such as polyacrylic resin, polystyrene, polypropylene, polyethylene, polyamide, and ethylene-vinyl acetate copolymers.

Preferred among these are polyacrylic binders, polyamide binders, wax binders, polyolefin binders, polyvinyl acetate binders, and mixtures thereof.

The organic binder is preferably added to zirconia powder such that the binder may occupy about 45 to 57% by volume, especially about 47 to 55% by volume of the mixture. If the amount of organic binder added exceeds 57% by volume, there appear the disadvantages of a long time to remove the binder, large shrinkage deformation after firing, and low sintered body density. If the amount of organic binder added is less than 47% by volume, the compound is less smoothly flowing so that it may cause clogging in the vicinity of a sprue-runnerless molding mold gate having a limited cross-sectional area, inhibiting full charging of the mold cavity with stable flow. In addition, the gate wears out soon, resulting in a shorter mold life.

The zirconia powder and the organic binder may be kneaded by conventional milling methods, preferably using a pressure kneader at 90° to 180° C. for 30 minutes to 5 hours. If desired, the zirconia compound may contain any other additives, for example, silane coupling agents, sintering aids such as clay, silica, alumina, and titania, and coloring agents such as transition metal compounds and rare earth metal compounds.

For injection molding purpose, the zirconia compound should flow smoothly. One convenient index representative of the flow of a zirconia compound is an apparent melt viscosity of the compound at a certain shear rate as measured by a capillary rheometer or the like. The preferred zirconia compound should have an apparent melt viscosity of up to 10,000 poise, more preferably up to 5,000 poise, especially up to 3,400 poise at a shear rate of 1000/sec. at 160° C. The lower limit of viscosity is not particularly limited although it is usually 500 poise. Although the apparent melt viscosity decreases with temperature, the temperature itself is limited by the heat resistance of the organic binder used. Then the useful temperature range of the compound is generally from 100° C. to 200° C. when actual molding conditions are taken into account. Also, the apparent melt viscosity decreases as the amount of binder added is increased. The amount of binder added should preferably be from 45 to 57% by volume of the mixture because more binder can induce quality problems as previously mentioned.

The zirconia compound is pelletized in a conventional manner and injected molded using a spure-runnerless molding mold. A variety of molds having a particular gate shape and a unique heating mechanism are commercially available for plastics molding and any desired one of them may be used herein.

Most often the gate is a pin gate. The diameter of the gate is generally determined in accordance with the cavity volume although it may also be limited by the desired product configuration. Preferably the ratio of gate diameter (mm) to cavity volume (cm$^3$) is from 0.05 to 15, more preferably from 0.1 to 10, especially from 0.2 to 5. If this ratio is less than 0.05, the cavity would not be fully charged or would be over a longer time. A ratio of more than 15 means that the gate is larger with respect to the product (or cavity), which imposes some limits on the location of the gate or requires some machining to cut off gate marks. The gate diameter is usually up to 3 mm and preferably at least 0.5 mm because a too small gate cross-sectional area would restrain charging of the cavity. It is recommended that the gate diameter ranges from 0.5 to 3 mm, especially from 0.6 to 2 mm.

Referring to the only figure, a mold 10 is illustrated in combination with a nozzle 1 extending from a melting cylinder (not shown). The mold 10 includes a manifold block 2, a first cavity plate 3, a second cavity plate 4, and a core plate 5 in juxtaposition. The manifold block 2 defines a manifold coupled to the nozzle passage and branched into four passages at 15. The cavity plates 3 and 4 define the runners 12 therein which communicate with the manifold passages through spear chips 11 and terminate at pin gates 9 of a reduced cross-sectional area. The second cavity plate 4 and the core plate 5 are mated to define cavities 13 therebetween. Each runner 12 is in fluid communication with the cavity 13 through the pin gate 9. A heater 6 is buried in the manifold block 2 for heating the manifold. A body heater 7 having a chip heater 8 at a downstream end is received in the runner 12 for heating the runner. Although the runner 12 is branched by the manifold and coupled to four cavities 13 in the illustrated embodiment, the manifold is not always necessary and either a combination of a single nozzle, a single runner and a single cavity or a combination of a single nozzle, more than two runners and more than two cavities is acceptable.

In an injection step, a zirconia compound in molten state 14 is introduced from the nozzle 1 into the manifold 2 and then the runner 12 and injected into the cavity 13 through the pin gate 9. At this stage, the runner 12 and the pin gate 9 are heated hot enough to keep the zirconia compound molten by actuating the heaters 6, 7 and 8. At this stage, the cavity 13 is usually cold. Injection conditions may be properly selected although it is preferred to use an injection pressure of 100 to 1,000 kg/cm$^2$, more preferably 100 to 850 kg/cm$^2$. The injection rate may be 2 to 20 cm/sec., although the injection rate will vary depending to the product figure.

Next, the chip heater 8 is interrupted so that the pin gate is cooled enough to allow the zirconia compound to solidify. The cavity is cold enough to allow the zirconia compound to solidify. With the heaters 6 and 7 on, the runner 12 is kept hot enough to keep the zirconia compound molten. Then the zirconia compound solidifies in the cavity 13 and the pin gate 9 while the zirconia compound remains molten in the runner 12.

After the solidification step, the core plate 5 is disintegrated and the solidified portion at the pin gate and the solidified portion in the cavity are mechanically separated by rupture, thus obtaining the solidified portion in the cavity as a runnerless green body. In particular, when the green body is taken away, tensile or shear stresses are loaded at the pin gate to break the solidified gate portion thereat. In the case of plastic resin compounds, snapping or cutting at the gate is rather difficult and there often occurs the phenomenon that one part is stretched from the remaining part in a stringing fashion. Then the product must be subsequently machined at the pinch-off site, which adds an extra step. However, in the case of zirconia compound, the product can be easily snapped off at the pin gate, presenting a smooth flush cut face and thus eliminating an extra step of machining, which contributes to a substantial manufacturing efficiency improvement. Strictly speaking, however, the cut section at the gate contains fine irregularities as a result of rupture and if such irregularities are undesired, the gate site or rupture line should be disposed outside the final contour or at an unimportant surface.

The green body obtained by injection molding in a mold in a sprue - runnerless fashion does not require an extra working step at the green stage. Elimination of an extra machining step means that the process is free of the risk of damaging the molding through cracking and crazing during machining or a failure by an accidental drop. This is one advantage over the conventional injection molding to produce a molding having an accompanying sprue and runner portion.

Thereafter, the green body is removed of the binder and finally fired. Binder removal is carried out typically by heating the green body from the ambient temperature to about 500° C. at a rate of 5°-150° C./hour to remove the organic binder through pyrolysis. The atmosphere in which the green body is heated for burning off the binder is usually air although an inert atmosphere such as helium and argon as well as a nitrogen atmosphere, either atmospheric or pressurized, may also be used. The heating time for burning off, which varies with the type of binder and the size of green body, generally ranges from 5 to 10 hours, preferably from 100 to 50 hours.

Finally the body is fired into a zirconia sintered body preferably at a temperature of 1,300° to 1,600° C., more preferably from 1,350° to 1,500° C. for 0.2 to 10 hours, more preferably 1 to 4 hours. The firing atmosphere may be air although an inert atmosphere of He, Ar, nitrogen or the like may also be used.

The resulting zirconia sintered bodies have a high sintered density corresponding to a relative density of 99% or higher, especially 99.5% or higher, although the exact density depends on the firing temperature. The density is measured by the Archimedean method. Sintered zirconia bodies containing yttria in solid solution form vary their theoretical density in accordance with the amount of solid solution yttria and crystalline phase. Table 1 shows the amount of solid solution yttria, theoretical density and a density corresponding to a relative density of 99%.

TABLE 1

| | Solid solution yttria and theoretical density | | |
|---|---|---|---|
| $Y_2O_3$ mol % | Crystalline phase | Theoretical density* (g/cm$^3$) | Relative density 99% (g/cm$^3$) |
| 2 | tetragonal | 6.115 | 6.054 |
| 3 | tetragonal | 6.102 | 6.041 |
| 8 | cubic | 6.016 | 5.956 |
| 10 | cubic | 5.997 | 5.937 |

*density of $ZrO_2$ containing 2% by weight of $HfO_2$

If a zirconia compound is less flowing during injection molding so that the cavity might be unevenly filled with zirconia particles, deformation can often occur during firing, resulting in an extremely low manufacturing yield. The use of the zirconia compound of the present invention which flows well eliminates deformation during firing, ensuring a very high manufacturing yield.

The sintered body is ready for use as a final product without further machining although machining or finishing may be carried out if desired.

The zirconia compound injection molding method and the sintered zirconia body preparing method according to the present invention have the following benefits. The injection molding in a sprue-runnerless fashion eliminates the wasteful consumption of zirconia compound, recycling of such waste, and extra machining of the green body at the gate site, all contributing to a leap in manufacturing efficiency. The zirconia compound used, because of its excellent fluidity and a relatively low binder content, offers the advantages of a reduced time for binder removal and high dimensional accuracy after firing due to minimal shrinkage. The resulting sintered zirconia body features least contamination, a high sintered density corresponding to at least 99% of the theory, white transparency, surface smoothness, and luster.

EXAMPLE

Examples of the present invention are given below by way of illustration and not by way of limitation.

Example 1

A zirconia powder having an average particle size of 0.25 μm as measured by the centrifugal sedimentation method, a specific surface area of 9.1 m$^2$/g as measured by the BET method, and a product of average particle size by specific surface area of 2.28 μm·m$^2$/g and containing 3 mol% of yttria in solid solution form (prepared by the method disclosed in JP-A 185821/1988) was mixed with an organic binder in the form of Seramo IB-27 polyacrylic binder (trade name of a mixture of acrylic resin, ethylene - vinyl acetate copolymer, paraffin, and dibutyl phthalate, available from Daiichi Kogyo Seiyaku K.K.) such that the binder occupied 52.5% by volume. The mixture was milled in a pressure kneader at 150° C. for one hour and pelletized through a pelletizer, obtaining an injection molding compound. The compound was measured for flow using an Instron capillary rheometer (Model 3211 by Instron Co.) under conditions: capillary diameter 0.05 inches, length 0.5 inches, and 160° C. It had an apparent melt viscosity of 2000 poise at a shear rate of 1000/sec.

The mold used is a sprue-runnerless injection molding mold having four box-shaped cavities dimensioned 25×22 mm, 20 mm deep and 1 mm thick (volume 1.9 cm$^3$) and a pin gate of 0.8 mm in diameter (trade name Spear System available from Seiki K.K.). The ratio of gate diameter to cavity volume was 0.42 (mm/cm$^3$). Using this mold, the compound was injected molded into a green body under the following conditions.

Molding conditions
Cylinder temperature: 160° C.
Mold temperature: 30° C.
Heater temperature: 160° C.
Heater operating cycle: 10 sec. on/27 sec. cycle
Injection pressure: 780 kg/cm$^2$
Injection rate: 8 cm/sec.

When the green body was taken out of the mold, it was substantially flat at the gate and did not require finish. The green body was removed of the binder and fired under the following conditions.

Binder removal conditions
Temperature range: 20° to 500° C.
Heating rate: 10°–20° C./hour
Binder removal time: 24 hours
Firing conditions
Air, 1450° C., 2 hours The resulting box-shape sintered body was free of a crack and deformation and appear white, lustrous and highly transparent. It had a linear shrinkage of 21.9% and a high density of 6.08 g/cm$^3$ or relative density of 99.6%. The molding yield was 100%.

EXAMPLE 2

A compound was obtained as in Example 1 except that the binder occupied 50.7% by volume. The compound was measured for flow as in Example 1 to find an apparent melt viscosity of 3000 poise at a shear rate of 1000/sec. Using a similar mold, the compound was injected molded under the following conditions.

Molding conditions
Cylinder temperature: 170° C.
Mold temperature: 35° C.
Heater temperature: 160° C.
Heater operating cycle: 10 sec. on/47 sec. cycle
Injection pressure: 780 kg/cm$^2$
Injection rate: 12 cm/sec.

The resulting green body was as good as in Example 1. It was removed of the binder and fired as in Example 1.

The sintered body was free of a crack and deformation and appeared white, lustrous and highly transparent. It had a linear shrinkage of 21.0% and a high density of 6.08 g/cm$^3$ or relative density of 99.6%. The molding yield was 100%.

EXAMPLE 3

To 100 parts by weight of the same zirconia powder as used in Example 1 was added the following binder.

| Ingredients | Part by weight |
| --- | --- |
| Acrylic resin (BR 105 by Mitsubishi Rayon K.K.) | 7 |
| Ethylene-vinyl acetate copolymer (Ultracene 633 by Toso K.K.) | 4 |
| Paraffin wax (reagent grade) | 4 |
| Dibutyl phthalate (reagent grade) | 3 |

The mixture in which the binder occupied 52.5% by volume was kneaded in a pressure kneader to form a compound as in Example 1. The compound was measured for flow as in Example 1 to find an apparent melt viscosity of 2000 poise at a shear rate of 1000/sec. Thereafter, using a similar mold, the compound was injected molded under the following conditions.

Molding conditions
Cylinder temperature: 160° C.
Mold temperature: 30° C.
Heater temperature: 160° C.
Heater operating cycle: 10 sec. on/35 sec. cycle
Injection pressure: 780 kg/cm$^2$
Injection rate: 8 cm/sec.

The resulting green body was as good as in Example 1. It was removed of the binder and fired as in Example 1.

The sintered body was free of a crack and deformation and appeared white, lustrous and highly transparent. It had a linear shrinkage of 22.0% and a high density of 6.09 g/cm$^3$ or relative density of 99.8%. The molding yield was 100%.

EXAMPLE 4

To 100 parts by weight of the same zirconia powder as used in Example 1 was added the following binder.

| Ingredients | Parts by weight |
| --- | --- |
| Acrylic resin (BR 105 by Mitsubishi Rayon K.K.) | 3.5 |
| Ethylene-vinyl acetate copolymer (Ultracene 633 by Toso K.K.) | 2.5 |
| Paraffin wax (reagent grade) | 5 |
| Dibutyl phthalate (reagent grade) | 2 |
| Stearic acid (reagent grade) | 1 |

The mixture in which the binder occupied 45.9% by volume was kneaded in a pressure kneader at 140° C. for 45 minutes to form a compound. The compound was measured for flow as in Example 1 to find an apparent melt viscosity of 1500 poise at a shear rate of 1000/sec. Thereafter, using a mold as in Example 1, the compound was injected molded under the following conditions.

Molding conditions
Cylinder temperature: 140° C.
Mold temperature: 40° C.

Heater temperature: 150° C.
Heater operating cycle: 10 sec. on/47 sec. cycle
Injection pressure: 210 kg/cm$^2$
Injection rate: 12 cm/sec.

The resulting green body was as good as in Example 1. It was removed of the binder and fired as in Example 1.

The sintered body was free of a crack and deformation and appeared white, lustrous and highly transparent. It had a linear shrinkage of 18.6% and a high density of 6.08 g/cm$^3$ or relative density of 99.6%. The molding yield was 100%.

EXAMPLE 5

A zirconia powder having an average particle size of 0.34 μm as measured by the centrifugal sedimentation method, a specific surface area of 7.2 m$^2$/g as measured by the BET method, and a product of average particle size by specific surface area of 2.45 μm·m$^2$/g and containing 3 mol% of yttria in solid solution form was mixed with an acrylic binder as in Example 1 such that the binder occupied 50.7% by volume. The mixture was kneaded in a pressure kneader to form a compound as in Example 1. The compound was measured for flow as in Example 1 to find an apparent melt viscosity of 2500 poise at a shear rate of 1000/sec. Thereafter, using a similar mold, the compound was injected molded under the following conditions.

Molding conditions
Cylinder temperature: 160° C.
Mold temperature: 30° C.
Heater temperature: 160° C.
Heater operating cycle: 10 sec. on/35 sec. cycle
Injection pressure: 780 kg/cm$^2$
Injection rate: 8 cm/sec.

The resulting green body was as good as in Example 1. It was removed of the binder and fired as in Example 1.

The sintered body was free of a crack and deformation and appeared white, lustrous and highly transparent. It had a linear shrinkage of 20.8% and a high density of 6.08 g/cm$^3$ or relative density of 99.6%. The molding yield was 100%.

EXAMPLE 6

A zirconia powder having an average particle size of 0.52 μm as measured by the centrifugal sedimentation method, a specific surface area of 5.7 m$^2$/g as measured by the BET method, and a product of average particle size by specific surface area of 2.96 μm·m$^2$/g and containing 3 mol% of yttria in solid solution form was mixed with an acrylic binder as in Example 1 such that the binder occupied 48.8% by volume. The mixture was kneaded in a pressure kneader to form a compound as in Example 1. The compound was measured for flow as in Example 1 to find an apparent melt viscosity of 4000 poise at a shear rate of 1000/sec. Thereafter, using a similar mold, the compound was injected molded under the same conditions as in Example 1.

The resulting green body was as good as in Example 1. It was removed of the binder and fired as in Example 1.

The sintered body was free of a crack and deformation and appeared white, lustrous and highly transparent. It had a linear shrinkage of 19.8% and a high density of 6.06 g/cm$^3$ or relative density of 99.3%. The molding yield was 95%.

COMPARATIVE EXAMPLE 1

A zirconia powder having an average particle size of 0.24 μm as measured by the centrifugal sedimentation method, a specific surface area of 17.4 m$^2$/g as measured by the BET method, and a product of average particle size by specific surface area of 4.18 μm·m$^2$/g and containing 3 mol% of yttria in solid solution form was mixed with an acrylic binder as in Example 1 such that the binder occupied 57.8% by volume. The mixture was kneaded in a pressure kneader to form a compound as in Example 1. The compound was measured for flow as in Example 1 to find an apparent melt viscosity of 3500 poise at a shear rate of 1000/sec. Thereafter, using a similar mold, the compound was injected molded under the following conditions.

Molding conditions
Cylinder temperature: 170° C.
Mold temperature: 35° C.
Heater temperature: 170° C.
Heater operating cycle: 10 sec. on/77 sec. cycle
Injection pressure: 1050 kg/cm$^2$
Injection rate: 12 cm/sec.

As compared with Example 1, the injection pressure was increased and the mold wore out. The resulting green body was removed of the binder and fired as in Example 1.

The sintered body was deformed. It had a linear shrinkage of 24.9% and a density of 6.04 g/cm$^3$ or relative density of 99.0%. The molding yield was 70% which was lower than all the Examples.

COMPARATIVE EXAMPLE 2

A zirconia powder as in Comparative Example 1 was mixed with an acrylic binder as in Example 1 such that the binder occupied 56.1% by volume. The mixture was kneaded in a pressure kneader to form a compound as in Example 1. The compound was measured for flow as in Example 1 to find an apparent melt viscosity of 4500 poise at a shear rate of 1000/sec. Thereafter, using a similar mold, the compound was injected molded under the following conditions.

Molding conditions
Cylinder temperature: 170° C.
Mold temperature: 35° C.
Heater temperature: 170° C.
Heater operating cycle: 10 sec. on/67 sec. cycle
Injection pressure: 1300 kg/cm$^2$
Injection rate: 12 cm/sec.

As compared with Example 1, the injection pressure was increased and the mold wore out. The resulting green body was removed of the binder and fired as in Example 1.

The sintered body was deformed. It had a linear shrinkage of 24.3% and a density of 6.04 g/cm$^3$ or relative density of 99.0%. The molding yield was 40% which was extremely lower than all the Examples.

COMPARATIVE EXAMPLE 3

A zirconia powder having an average particle size of 0.55 μm as measured by the centrifugal sedimentation method, a specific surface area of 6.0 m$^2$/g as measured by the BET method, and a product of average particle size by specific surface area of 3.30 μm·m$^2$/g and containing 3 mol% of yttria in solid solution form was mixed with an acrylic binder as in Example 1 such that the binder occupied 52.5% by volume. The mixture was kneaded in a pressure kneader to form a compound as in Example 1. The compound was measured for flow as in Example 1 to find an apparent melt viscosity of 2000 poise at a shear rate of 1000/sec. Thereafter, using a similar mold, the compound was injected molded under the following conditions.

Molding conditions
Cylinder temperature: 160° C.
Mold temperature: 30° C.
Heater temperature: 160° C.
Heater operating cycle: 10 sec. on/55 sec. cycle
Injection pressure: 520 kg/cm$^2$
Injection rate: 12 cm/sec.

As compared with Example 1, the mold wore out much. The resulting green body was removed of the binder and fired as in Example 1.

The sintered body was largely deformed. It had a linear shrinkage of 21.6% and a density of 6.00 g/cm$^3$ or relative density of 98.3%. The molding yield was 80% which was lower than all the Examples.

COMPARATIVE EXAMPLE 4

A zirconia powder as in Comparative Example 3 was mixed with an acrylic binder as in Example 1 such that the binder occupied 50.7% by volume. The mixture was kneaded in a pressure kneader to form a compound as in Example 1. The compound was measured for flow as in Example 1 to find an apparent melt viscosity of 2500 poise at a shear rate of 1000/sec. Thereafter, using a similar mold, the compound was injected molded under the following conditions.

Molding conditions
Cylinder temperature: 160° C.
Mold temperature: 30° C.
Heater temperature: 160° C.
Heater operating cycle: 10 sec. on/65 sec. cycle
Injection pressure: 780 kg/cm$^2$
Injection rate: 12 cm/sec.

As compared with Example 1, the mold wore out much. The resulting green body was removed of the binder and fired as in Example 1.

The sintered body was largely deformed. It had a linear shrinkage of 20.7% and a density of 5.99 g/cm$^3$ or relative density of 98.2%. The molding yield was 50% which was extremely lower than all the Examples.

The parameters and results of these Examples and Comparative Examples are reported in Table 2.

TABLE 2

| | Example | | | | | | Comparative Example | | | |
|---|---|---|---|---|---|---|---|---|---|---|
| | 1 | 2 | 3 | 4 | 5 | 6 | 1 | 2 | 3 | 4 |
| Zirconia compound | | | | | | | | | | |
| Zirconia powder | | | | | | | | | | |
| Average particle size (μm) | 0.25 | 0.25 | 0.25 | 0.25 | 0.34 | 0.52 | 0.24 | 0.24 | 0.55 | 0.55 |
| BET specific surface area (m$^2$/g) | 9.1 | 9.1 | 9.1 | 9.1 | 7.2 | 5.7 | | | 6.0 | 6.0 |
| Product (μm · m$^2$/g) | 2.28 | 2.28 | 2.28 | 2.28 | 2.45 | 2.96 | | | | |
| Yttria content (mol %) | 3 | 3 | 3 | 3 | 3 | 3 | 3 | 3 | | |
| Binder | | | | | | | | | | |
| Type | PA | PA | Mix. | Mix. | PA | PA | PA | PA | PA | PA |
| Amount (vol %) | 52.5 | 50.7 | 52.5 | 45.9 | 50.7 | 48.8 | 57.8 | 56.1 | 52.5 | 50.7 |
| Apparent viscosity (poise at shear rate 1000/sec.) | 2000 | 3000 | 2000 | 1500 | 2500 | 4000 | 3500 | 4500 | 2000 | 2500 |
| Mold specifications | | | | | | | | | | |
| Cavity volume (cm$^3$) | 1.9 | 1.9 | 1.9 | 1.9 | 1.9 | 1.9 | 1.9 | 1.9 | 1.9 | 1.9 |
| Pin gate diameter (mm) | 0.8 | 0.8 | 0.8 | 0.8 | 0.8 | 0.8 | 0.8 | 0.8 | 0.8 | 0.8 |
| Pin gate diameter/cavity volume (mm/cm$^3$) | 0.42 | 0.42 | 0.42 | 0.42 | 0.42 | 0.42 | 0.42 | 0.42 | 0.42 | 0.42 |
| Molding conditions | | | | | | | | | | |
| Injection pressure (kg/cm$^2$) | 780 | 780 | 780 | 210 | 780 | 780 | 1050 | 1300 | 520 | 780 |
| Injection rate (cm/sec.) | 8 | 12 | 8 | 12 | 8 | 8 | 12 | 12 | 12 | 12 |
| Results | | | | | | | | | | |
| Shrinkage by firing (%) | 21.9 | 21.0 | 22.0 | 18.6 | 20.8 | 19.8 | 24.9 | 24.3 | 21.6 | 20.7 |
| Density (g/cm$^3$) | 6.08 | 6.08 | 6.09 | 6.08 | 6.08 | 6.06 | 6.04 | 6.04 | 6.00 | 5.99 |
| Relative density (%) | 99.6 | 99.6 | 99.8 | 99.6 | 99.6 | 99.3 | 99.0 | 99.0 | 98.3 | 98.2 |
| Yield (%) | 100 | 100 | 100 | 100 | 100 | 95 | 70 | 40 | 80 | 50 |

We claim:

1. A method for injection molding a zirconia composition in a mold defining a cavity and having a runner and a pin gate disposed at the end of the runner in fluid communication with the cavity, said pin gate having a diameter of 0.5 to 3 mm and the ratio of the gate diameter (mm) to the cavity volume (cm$^3$) being in the range of 0.05 to 15, said zirconia composition being comprised of an organic binder in an amount of 45 to 57%, by volume of the composition, and a zirconia power containing 2 to 10 mol% of Y$_2$O$_3$ and having a specific surface area of 5 to 10 m$^2$/g as measured by the BET method and a product of an average particle size by the specific surface area of 1.0 to 2.7 μm·m$^2$/g, said method comprising an injection step of passing the zirconia composition in molten state through the runner and injecting it into the cavity through the pin gate while the runner is heated hot enough to keep the zirconia composition molten, a solidification step in which the runner is kept hot enough to keep the zirconia composition molten and the pin gate is cooled enough to allow the zirconia composition to solidify so that the zirconia composition solidifies in the cavity and the pin gate while the zirconia composition remains molten in the runner, and a separation step of separating the solidified portion at the pin gate and the solidified portion in the cavity by rupture, thus obtaining the solidified portion in the cavity as a runnerless molding.

2. A method for preparing a sintered zirconia body comprising the steps of
(1) injection molding a zirconia composition in a mold defining a cavity and having a runner and a pin gate disposed at the end of the runner in fluid communication with the cavity, said pin gate having a diameter of 0.5 to 3 mm and the ratio of the gate diameter (mm) to the cavity volume (cm$^3$) being in the range of 0.05 to 15, said zirconia composition being comprised of an organic binder in an amount of 45 to 57%, by volume of the composition, and a zirconia powder containing 2 to 10 mol% of Y$_2$O$_3$ and having a specific surface area of 5 to 10 m$^2$/g as measured by the BET method and a product of an average particle size by the specific surface area of 1.0 to 2.7 μm·m$^2$/g, said injection molding step including an injection step of passing the zirconia composition in molten state through the runner and injecting it into the cavity through the pin gate while the runner is heated hot enough to keep the zirconia composition molten, a solidification step in which the runner is kept hot enough to keep the zirconia composition molten and the pin gate is cooled enough to allow the zirconia composition to solidify so that the zirconia composition solidifies in the cavity and the pin gate while the zirconia composition remains molten in the runner, and a separation step of separating the solidified portion at the pin gate and the solidified portion in the cavity by rupture, thus obtaining the solidified portion in the cavity as a runnerless green body, (2) removing the binder from the green body, and (3) firing the green body into a sintered body.

3. The method of claim 1 or 2, wherein said zirconia compound has an apparent melt viscosity of up to 10,000 poise at a shear rate of 1,000/sec.

4. The method of claim 1 or 2, wherein said zirconia powder has an average particle size of 0.2 to 0.35 μm.

5. The method of claim 1 or 2, wherein said zirconia powder contains 2 to 8 mol% Y$_2$O$_3$.

6. The method of claim 1 or 2, wherein said organic binder is selected from the group consisting of polyacrylic binders, polyamide binders, wax binders, polyolefin binders, polyvinyl acetate binders, and mixtures thereof.

7. The method of claim 1 or 2, wherein said organic binder is contained in an amount of 47 to 55%, by volume of the composition.

8. The method of claim 2, wherein said binder is removed from said green body by heating said green body up to 500° C.

9. The method of claim 2, wherein said firing step is carried out at a temperature of from 1,350 to 1500° C.

* * * * *